Patented Apr. 28, 1942

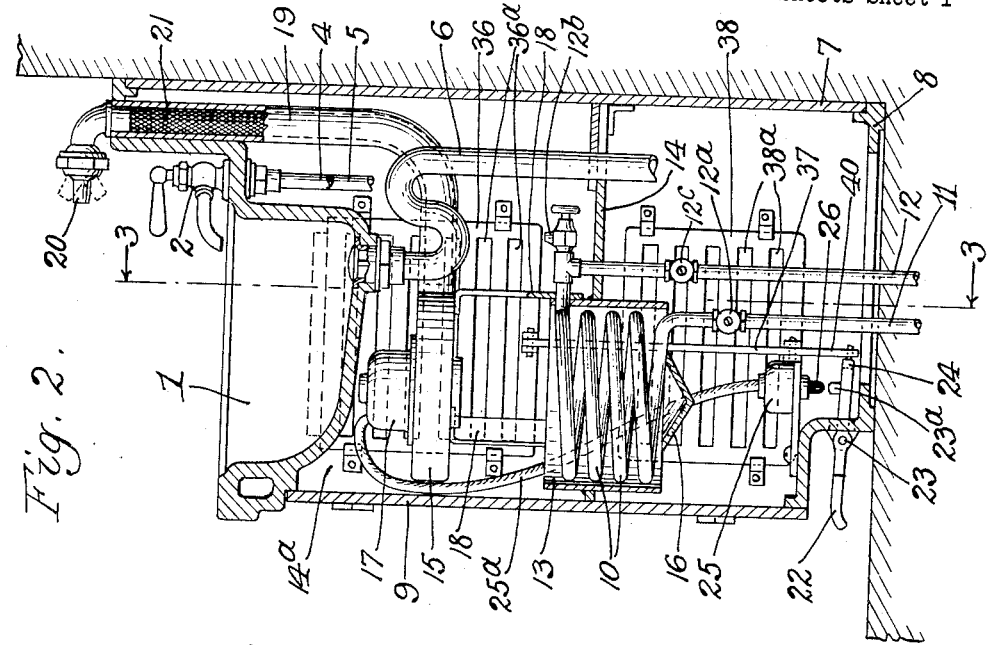
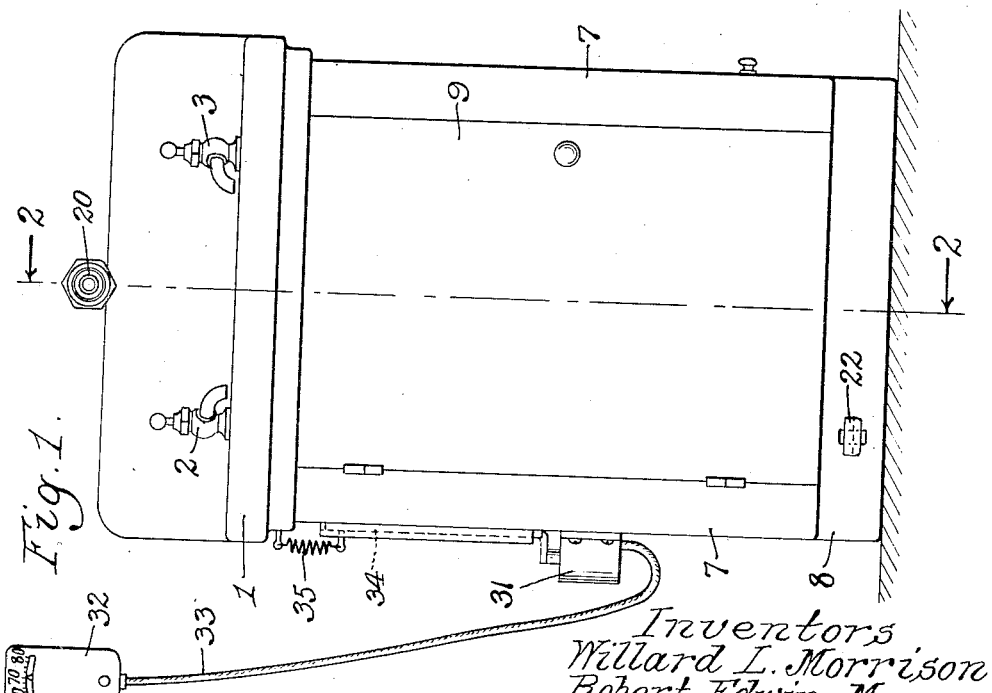

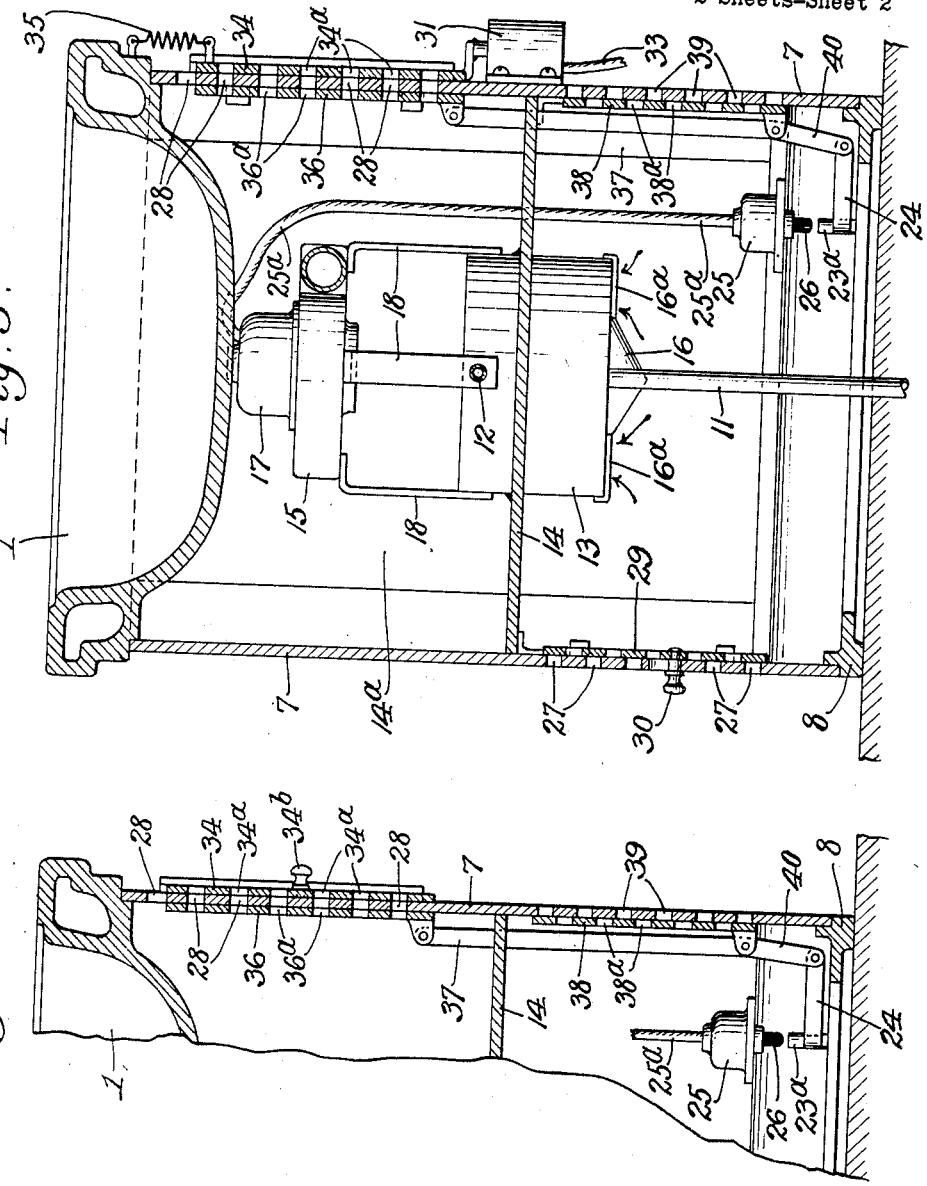

2,281,370

UNITED STATES PATENT OFFICE 2,281,370

COMBINATION WASHROOM FIXTURE

Willard L. Morrison, Lake Forest, and Robert Edwin Moore, Park Ridge, Ill.

Application October 28, 1938, Serial No. 237,514

4 Claims. (Cl. 4—166)

This invention relates to a combination washroom fixture and has for its object to provide a new and improved device of this description.

The invention has as a further object to provide a combination washroom fixture wherein there is a hot air hand drying device, a heating device for heating the air for the hand drying device and which is also used to heat the room, and a wash bowl, the three devices occupying the same floor space that would be usually occupied by the wash bowl.

In the air hand drying devices now in use, the first two or three people who use it after it has been out of use for a considerable time, do not get the properly heated air to dry the hands, and one of the objects of this invention is to provide such a device where the first party, as well as the succeeding parties who use the device, will have properly heated air directed without delay upon their hands to properly dry them. The invention has as a further object to provide a hot air hand drying device having a hot air storage chamber with hot air for instant use when the hand drying device is started.

The invention has further objects which are more particularly pointed out in the accompanying description.

One form of the device is illustrated in the drawings, wherein,

Fig. 1 is a front elevation of the combined washroom fixture embodying the invention;

Fig. 2 is a sectional view taken on line 2—2 of Fig. 1;

Fig. 3 is a sectional view taken on line 3—3 of Fig. 2; and

Fig. 4 is a view similar to Fig. 3, with parts broken away, showing a modified construction.

Like numerals refer to like parts throughout the several figures.

Referring now to the drawings, there is illustrated a wash bowl 1 provided with hot and cold water faucets 2 and 3, by means of which hot and cold water may be discharged into the bowl. The hot and cold water faucets may be connected to suitable sources of hot and cold water in the usual way, as by means of the pipes 4 and 5. The bowl 1 is provided with a discharge pipe 6 which leads to any desired discharge point, as the sewer.

The bowl is supported in position in any desired manner. As herein shown, the bowl is supported upon the stand or casing 7 having a base 8. The stand or casing is preferably arranged as a heat insulating enclosed structure, having a door 9 which conceals the devices underneath the bowl and which may be opened to secure access thereto. The bowl acts as one wall of the stand or casing.

Located within the stand and beneath the bowl is a heating device 10, which is herein shown as a heating coil, and which may be a hot water coil or a steam coil. This coil is connected in the heating circuit by the pipes 11 and 12. There are valves 12a and 12c in the pipes 11 and 12, so that the heating fluid may be shut off from the coil 10 and the coil and parts serviced without interfering with any other part of the heating system. There is also an air valve 12b which automatically discharges any air that may accumulate at this point. The coil may be simply a loop from the hot water service pipe for the wash room or from the central steam or hot water heating system and may therefore be installed at very small expense. This coil is preferably located in a casing 13 which is supported in any desired manner. There is preferably a wall 14 extending across the interior of the stand and the casing 13 is open at the bottom so that air can pass in upwardly through the casing into contact with the coil, and be directed to a blower 15 mounted above the coil. If a single coil is used, we prefer to provide an air deflecting device 16, which is located opposite the open center of the coil and which deflects the air away from the open center of the coil so that it makes direct contact with the pipe of the coil. The deflecting device may be supported in any desired manner, as by means of the supporting pieces 16a which are connected with the casing 13. The air passes up between these supporting pieces. If there should be a second coil inside of the first coil, the deflecting device would not be used. The chamber 14a acts as a hot air storage chamber for the dryer.

The blower 15 is provided with a motor 17 which is preferably an electric motor, and the motor and the blower are preferably connected together to form a unit and may be supported in any desired manner, as by the supporting members 18 attached to the coil casing 13.

There is a pipe 19 leading to the nozzle 20, where the hot air is discharged onto the hands. In order to make the device so that the hot air can be used to dry the hair, the nozzle is connected to a flexible pipe 21 located within the pipe 19, so that the nozzle can be drawn out to any desired position, the flexible pipe moving along the pipe 19 to permit this. When it is desired to dry the hands or the hair, it is simply necessary to start the electric motor and the blower. The stand is filled with hot air heated by the coil 10, and hence immediately this hot air will be driven by the blower and discharged through the nozzle 20. In drying the hair, the nozzle is pulled out to bring it into proper position in relation to the hair.

The motor may be started in any desired manner. As herein shown, there is a foot pedal 22 which is pivoted at 23 and which has a projection 24. There is an electric switch 25 which is provided with the proper contacts to which are connected the conductors leading to the electric motor 17 and which are enclosed in the insulation 25a. The electric switch is provided with a movable member 26 which is engaged by the part 23a on the projection 24 when the foot pedal is pressed down, so as to connect the contacts in the electric switch 25 and complete the circuit to the motor 17, thus starting the motor and the blower in operation to discharge hot air from the coil 10 through the nozzle 20.

When the nozzle 20 is not being used, the hot air in the stand is used to heat the wash room. This result is secured by providing inlet openings 27 at the bottom of the stand and outlet openings 28 at the top of the stand, the air passing in through the inlet openings and up through the casing 13 and out the outlet openings 28. There is a controlling member 29 for the inlet openings 27, which is moved by a handle 30 so as to close these openings in the summer time when it is not desired to heat the washroom. Some means is also provided for closing the openings 28. They may be closed by hand, or they may be actuated by means of an electromagnetic device 31, the circuit through which is controlled by a temperature controlled thermostat 32 which actuates a switch controlling the electric circuit leading therefrom through the cable 33 to the electromagnetic device 31. When the temperature in the room rises above a predetermined point, the circuit through the electromagnetic device 31 is broken so as to de-energize it and the spring 35 then pulls the control member 34 upwardly so as to close the discharge openings 28 and prevent heated air from entering the room. When the temperature falls below a predetermined point, the circuit is completed through the electromagnetic device 31 and the electromagnetic device 31 then moves the control member 34 downwardly to cause the openings 34a therein to register with the discharge openings 28, so as to open the discharge openings 28 and permit heated air to enter the room, as shown in Fig. 3. In the summer time the inlet openings 27 and the discharge openings 28 may remain closed if the temperature is such as not to require heating of the room.

Some means is provided when the device is being used to heat the room, to close the openings 28 when the hand drying device is in operation. As herein shown, this is accomplished by providing a control device 36, which has openings 36a which register with the discharge openings 28 when it is desired to have the discharge openings open and which is controlled by a controlling member 37 operated by the projection 24 on the pedal 22. This same controlling member 37 may also control the controlling device 38, which controls the admission openings 39 and which has openings 38a which register with the admission openings 39 when it is desired to have the admission openings 39 open. The controlling member 37 is connected to the projection 24 on the foot pedal 22 by the link 40. It will be seen that when the foot pedal is pressed down to close the circuit in the switch 25, the projection 24, link 40 and control devices 36 and 38 will be moved upwardly to move the openings 36a out of register with the discharge openings 28 and the openings 38a into register with the admission openings 29, to close the discharge openings 28 and open the admission openings 39, so that all the heated air will pass to the nozzle 20. When the pedal is released, the control device will move to open the discharge openings 28 and the controlling device 38 will close the admission openings 39, as shown in Fig. 3. In the summer time when the admission openings 27 are closed, the discharge openings 28 may also be closed, and the movement of the pedal will simply close the openings 28 and open the admission openings 39 to let air in to be heated to then be passed through the nozzle 20.

Fig. 4 shows a modified construction where the control member 34 is moved to open or close the discharge openings 28 by hand, there being a hand hold 34b connected therewith for this purpose. In this case the control member 34 will be held in either its closed or open positions in any desired manner, preferably by friction.

We claim:

1. A combination wash room fixture comprising an enclosure, heating coil in said enclosure, means for supplying heating fluid to said heating coil, an air discharging nozzle, a blower, an electric motor for driving said blower, a connection between said blower and said nozzle, a circuit closing device for closing the electric circuit through said motor to set said blower in operation to discharge hot air from said enclosure through said nozzle, a separate discharge opening separate from said nozzle, for discharging hot air from the enclosure into the room, a controlling device for said separate discharge opening, and a connection between said controlling device and said circuit closing device, which moves the controlling device to close said separate discharge opening while the motor is in operation.

2. A combination wash room fixture comprising an enclosure, a heating coil in said enclosure, means for supplying heating fluid to said heating coil, an air discharging nozzle, a blower, an electric motor for driving said blower, a connection between said blower and said nozzle, a circuit closing device for closing the electric circuit through said motor, to set said blower in operation to discharge hot air from said enclosure through said nozzle, a separate discharge opening separate from said nozzle, for discharging hot air from the enclosure into the room, a controlling device for said separate discharge opening, a connection between said controlling device and said circuit closing device, which moves the controlling device to close said opening while the motor is in operation, an admission opening separate from said nozzle and discharge opening, for admitting air into said enclosure, a controlling device therefor, and means connected with said circuit closing device for moving said controlling device to open the admission opening when the motor is in operation.

3. In combination with a hot air hand drying device having a nozzle, of an enclosure, a heating device in said enclosure which heats the space in the enclosure, a discharge opening in said enclosure separate from said nozzle for discharging heated air into a room to heat it, means for discharging hot air from said heating device through said nozzle, to dry the hands, a starting device therefor, and means associated with said starting device for closing the discharge opening in the enclosure, when the starting device is actuated.

4. In combination with a hot air hand drying device having a nozzle, of an enclosure, a heating device in said enclosure which heats the space in the enclosure, a discharge opening in said enclosure separate from said nozzle for discharging heated air into a room to heat it, means for discharging hot air from said heating device through said nozzle, to dry the hands, a starting device therefor, means associated with said starting device for closing the discharge opening in the enclosure separate from said nozzle, when the starting device is actuated, and means for automatically opening said latter discharge opening when the starting device is in its inoperative position.

WILLARD L. MORRISON.
ROBERT EDWIN MOORE.